United States Patent
Gilson

(10) Patent No.: US 9,307,021 B2
(45) Date of Patent: Apr. 5, 2016

(54) ADAPTIVE MEDIA TRANSMISSION PROCESSING

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 145 days.

(21) Appl. No.: 13/778,852

(22) Filed: Feb. 27, 2013

(65) Prior Publication Data

US 2014/0244995 A1    Aug. 28, 2014

(51) Int. Cl.
*H04L 29/08* (2006.01)
*H04L 29/06* (2006.01)
*H04N 21/2347* (2011.01)
*H04N 21/2387* (2011.01)
*H04N 21/845* (2011.01)

(52) U.S. Cl.
CPC .......... *H04L 67/104* (2013.01); *H04L 63/0428* (2013.01); *H04N 21/2387* (2013.01); *H04N 21/23476* (2013.01); *H04N 21/8455* (2013.01)

(58) Field of Classification Search
None
See application file for complete search history.

(56) References Cited

U.S. PATENT DOCUMENTS

| | | | | | |
|---|---|---|---|---|---|
| 6,026,232 | A | * | 2/2000 | Yogeshwar | G11B 27/034 358/537 |
| 6,353,700 | B1 | * | 3/2002 | Zhou | G11B 27/034 375/E7.094 |
| 6,907,070 | B2 | * | 6/2005 | Wu | H04N 19/34 375/240.12 |
| 7,295,673 | B2 | * | 11/2007 | Grab | H04K 1/00 348/E7.056 |
| 7,437,054 | B2 | * | 10/2008 | Noh | H04N 5/783 375/E7.014 |
| 8,229,983 | B2 | * | 7/2012 | Walker | H04N 21/23439 348/14.01 |
| 8,233,621 | B2 | * | 7/2012 | Li | H04N 7/1675 375/240.16 |
| 8,332,884 | B2 | * | 12/2012 | Reckless | H04N 7/163 725/28 |
| 8,498,520 | B2 | * | 7/2013 | Pejhan | H04N 5/783 386/326 |
| 2004/0081333 | A1 | * | 4/2004 | Grab | H04K 1/00 382/100 |
| 2004/0252970 | A1 | * | 12/2004 | Noh | H04N 5/783 386/346 |
| 2006/0123456 | A1 | * | 6/2006 | Dei | H04N 7/162 725/146 |
| 2007/0230699 | A1 | * | 10/2007 | Vince | H04N 7/1675 380/239 |
| 2008/0273698 | A1 | * | 11/2008 | Manders | H04N 5/783 380/200 |
| 2009/0119722 | A1 | * | 5/2009 | VerSteeg | H04N 21/234381 725/87 |
| 2012/0294360 | A1 | * | 11/2012 | Walker | H04N 21/23439 375/240.13 |
| 2013/0268573 | A1 | * | 10/2013 | Lee | H04L 29/08135 709/201 |

FOREIGN PATENT DOCUMENTS

WO    WO-2012/047158 A1    4/2012

OTHER PUBLICATIONS

Jian, L., et al. "Complexity and memory efficient gop structures supporting vcr functionalities in H.264/AVC." Circuits and Systems, pp. 636-639 (2008).
Yang, et al. "Design of frame dependency for vcr streaming videos." Signal Processing, 22(5), pp. 505-514 (2007).
Zhou, J., et al. "VCR functionalities with adaptive rate adjustment in streaming media server." Ninth IEEE International Conference on Computer and Information Technology, pp. 150-155 (2009).
Extended European Search Report issued May 9, 2014 for European Patent Application No. 14156542.4, which was filed on Feb. 25, 2014 and published as EP 2773126 on Aug. 6, 2014 (Inventor—Gilson; Applicant—Comcast Corp.) (pp. 1-11).

* cited by examiner

*Primary Examiner* — Dede Zecher
*Assistant Examiner* — Richard McCoy
(74) *Attorney, Agent, or Firm* — Ballard Spahr LLP

(57) ABSTRACT

Provided are methods and systems for processing information. In one example method a first frame of a first group of frames of an information transmission can be processed. The first frame can be encoded without reference to other frames of the information transmission. Additionally, a second frame can be processed in the first group of frames. The second frame can be processed with reference to a frame from a second group of frames of the information transmission.

21 Claims, 6 Drawing Sheets

ADAPTIVE MEDIA TRANSMISSION PROCESSING

BACKGROUND

In traditional media playback systems, such as CD, DVD, and VCR systems, users are able to freely rewind and fast forward a media file because the user has the entire media file in a storage medium located at the user's playback device. As network bandwidth continues to increase, more users are accessing media files through media transmission platforms. Media transmission (e.g., streaming), however, can consume large amounts of bandwidth. Providing the transmission at a faster rate can consume even greater amounts of bandwidth, which might not be available to users. These and other shortcomings will be addressed by the present disclosure.

SUMMARY

It is to be understood that both the following general description and the following detailed description are exemplary and explanatory only and are not restrictive, as claimed. Provided are methods and systems for processing information. In exemplary methods, a first frame of a first group of frames of an information transmission, such as a stream, can be processed (e.g., encoded). The first frame can be processed without reference to other frames of the information transmission. Additionally, a second frame can be processed in the first group of frames. The second frame can be processed with reference to a frame from a second group of frames of the information transmission.

In another aspect, a request to update rendering of an information transmission can be received. A first frame from a first group of frames of the information transmission can be processed (e.g., decoded) based on the request. In one aspect, the first group of frames can have at least one frame processed without reference to other frames of the information transmission. Additionally, a second frame can be processed from one of the first group of frames of the information transmission or a second group of frames of the information transmission based on the request. In another aspect, the second group of frames can have at least one frame processed without reference to other frames of the information transmission. Furthermore, the processing of the second frame can be performed with reference to the first frame.

In another aspect, a sequence of frames of information can be processed (e.g., encoded) into a compressed information transmission. The information can have at least two groups of frames. Each group of frames of the at least two groups of frames can have at least one frame processed without reference to other frames of the information. In additional, a set of reference frames can be processed based on a first encryption key. The set of reference frames can be frames from the at least two groups of frames. Other frames of the information can be processed based on at least one second encryption key. The other frames can be frames from the at least two groups of frames not included in the set of reference frames.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
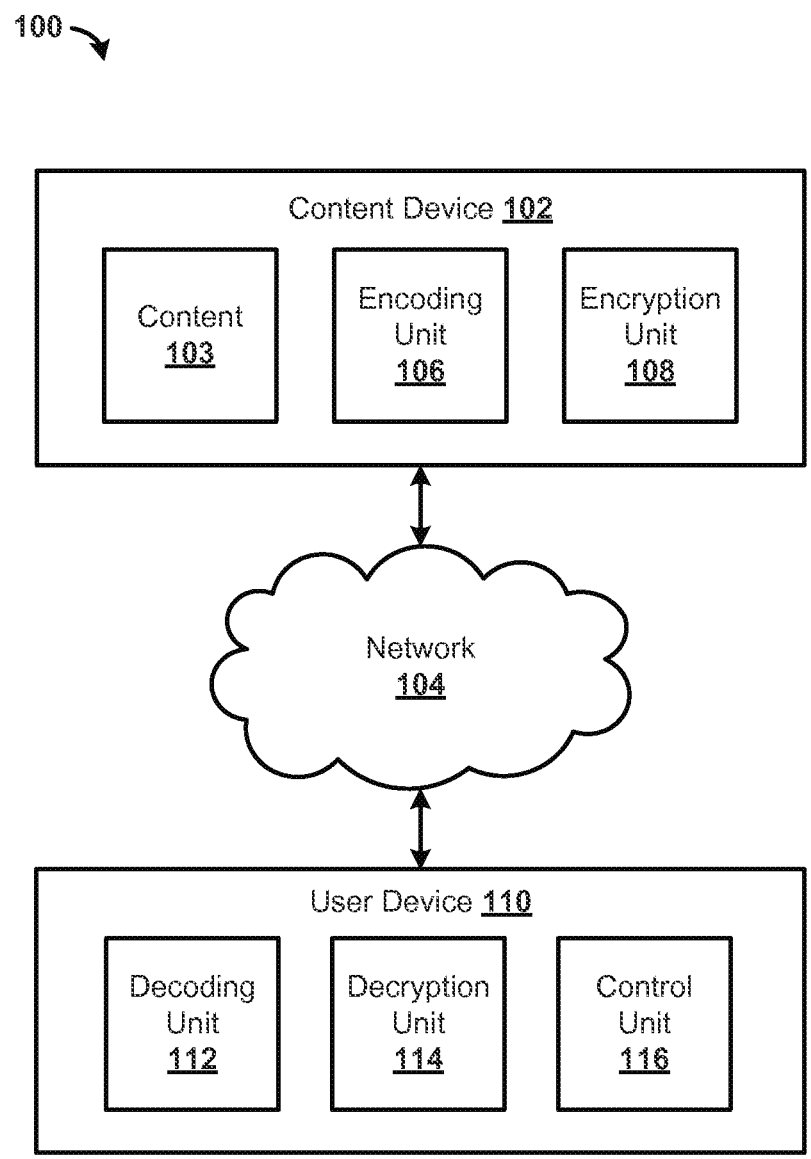
FIG. 1 is a block diagram illustrating an exemplary network for processing information.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 is a block diagram illustrating an exemplary system 100 for processing information. As used herein, the word "process" and variations of the word, such as "processing" and "processed" can comprise encoding, decoding, encrypting, decrypting, converting, linking, and the like. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 100 can comprise a content device 102. For example, the content device 102 can comprise a headend configured to distribute content 103 through a distribution and/or access network 104. In another aspect, the content device 102 can comprise a content server configured to distribute content 103 through the network 104. In one aspect, the content device 102 can comprise an encoding unit 106 configured to process the content 103. In one aspect, the encoding unit 106 can link, convert, and/or encode the content 103. For example, the encoding unit 106 can be configured to compress the content 103 to decrease the storage size of the content 103. In an aspect, the methods and systems can utilize digital audio/video compression, such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. Additional information regarding transport stream packets, the composition of the transport stream, types of MPEG tables, and other aspects of the MPEG standards are described below. In an exemplary embodiment, the present methods and systems can employ transmission of MPEG packets. However, the present methods and systems are not so limited, and can be implemented using other types of transmission and data.

In one aspect, the content device 102 can comprise an encryption unit 108 configured to process the content 103. The encryption unit 108 can use one or more encryption keys to convert the content 103 into a format that is generally undecipherable without the associated one or more encryption keys. For example, the encryption unit 108 can use one or more encryption algorithms. The encryption algorithms can provide one or more encryption keys to encrypt and decrypt the content 103. In one aspect, the encryption unit 108 can change the encryption key used to encrypt frames after encrypting a predefined number of frames of the information transmission. In another aspect described in more detail below, the encryption unit 108 can use different encryption keys for different types of frames.

In one aspect, the network 104 can distribute signals from the content device 102 to one or more user devices 110. The network 104 can comprise an optical fiber network, a coaxial cable network, a hybrid fiber-coaxial network, a wireless network, a satellite system, a direct broadcast system, or any combination thereof. In one aspect, the network 104 can be configured as a packet switched network such as the Internet. In another aspect, the network 104 can be configured for video on demand services, which can comprise, for example, transmitting packets of processed and/or encrypted content 103 from the content device 102 to the user device 110 at the request of the user device 110. Correspondingly, the user device 110 can be configured to receive processed and/or encrypted content 103 from the content provider 102.

In one aspect, the user device 110 can comprise a gateway or home communications terminal (HCT) which can decode, if needed, the signals for display on a display device, such as on a television set (TV) or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's, TV's, DVR's, home theater PC's, and the like.

As described above, the content 103 can be processed and/or encrypted by the content device 102. Thus, the user device 110 can comprise a decoding unit 112 configured to process the encoded content 103. The encoding unit 112 can be configured to process links, convert, and/or decode the processed content 103. For example, the decoding unit 112 can be configured to decompress content 103 (e.g., content encoded in MPEG or other compression format). In one aspect, the decoding unit 112 can be configured to convert the content 103 into a format acceptable for display through a display device. The user device 110 can also comprise a decryption unit 114 configured to process the encrypted content. For example, the decryption unit 114 can decrypt encrypted content. The decryption unit 114 can use an encryption key to convert the encrypted content 103 into a format acceptable for decoding and/or acceptable for display through a display device.

In another aspect, the user device 110 can comprise a control unit 116 configured to receive instructions from a user. For example, the control unit 116 can receive an instruction (e.g., through a remote control) to change the speed of play. The instruction to change the speed of play can comprise an instruction to fast forward or rewind content 103 at a desired speed. As another example, the control unit 116 can receive an instruction to change the resolution of play. The instruction can be received from the user or be received in response to detecting a condition of the user, user device, and/or the distribution network. Changing the resolution of play can comprise, for example, changing the number of frames of content received during a time period. The control unit 116 can make a request to the content device 102 to obtain one or more particular frames of the information transmission based on the received instruction.

In an exemplary embodiment, the methods and systems disclosed can be located within one or more of the content device 102 and user device 110. For example, the methods and systems disclosed can be located within the content 103, encoding unit 106, encryption unit 108, decoding unit 112, decryption unit 114, and control unit 116.

Figure 2A:
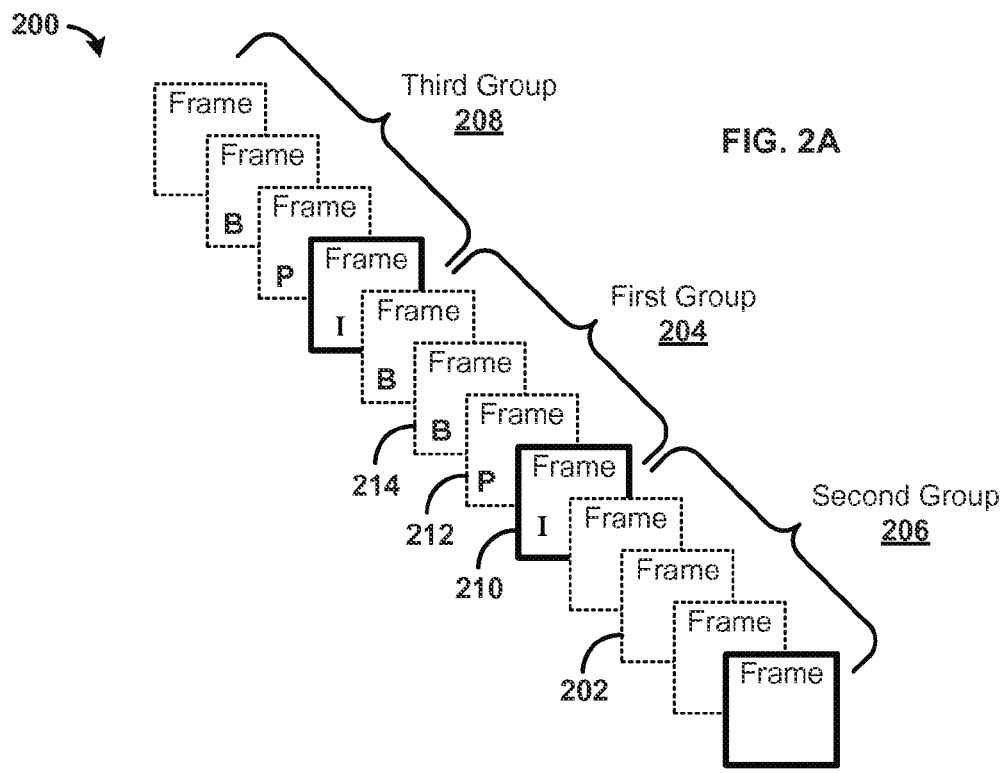
FIG. 2A is a diagram illustrating an exemplary information transmission.
Figure 2B:
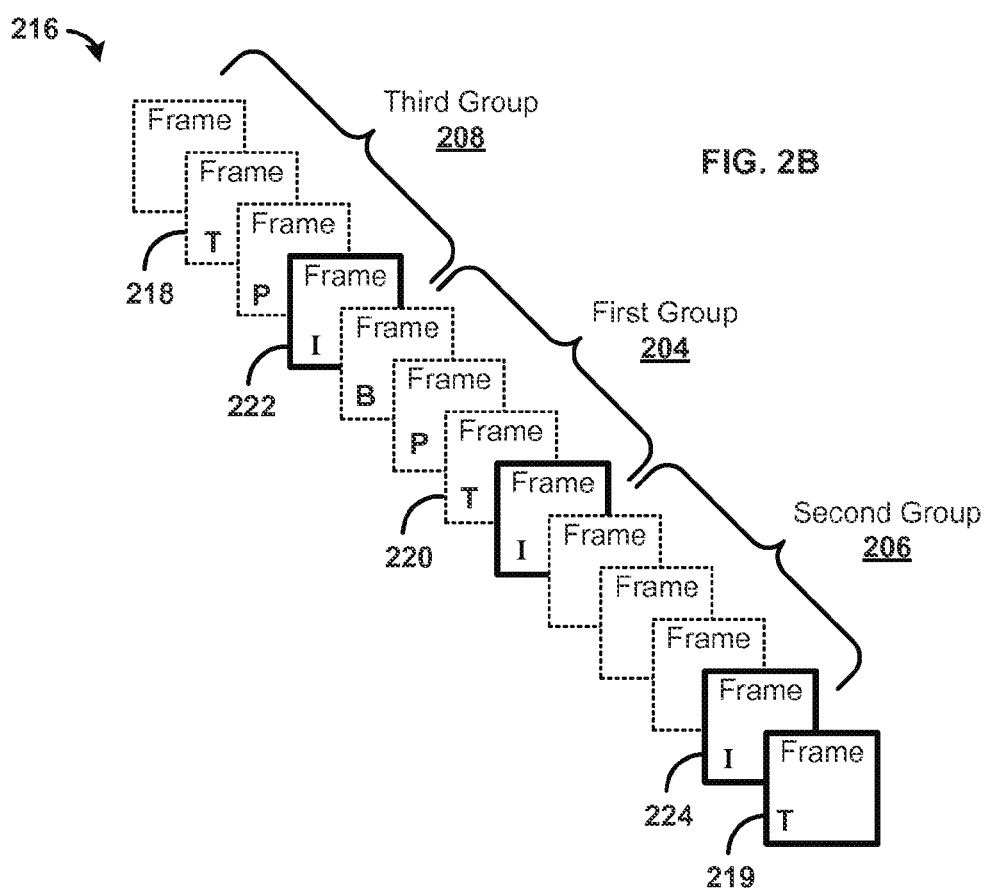
FIG. 2B is a diagram illustrating another exemplary information transmission.

FIG. 2A is a diagram illustrating an exemplary information transmission 200 (e.g., information stream). In one aspect, the information transmission 200 can comprise a plurality of frames 202. Each of the frames 202 can be compressed, converted, and/or linked by an encoding unit 106 at the content device 102. Though the following description makes reference to encoding and variants thereof (e.g., encode, encoding), it should be understood that other processing (e.g., linking, converting, and/or the like) can be performed in addition to or instead of the encoding. The frames 202 can be organized in groups 204, 206, 208. For purposes of illustration, FIGS. 2A and 2B show three groups of frames, each group having four frames of the several types described below. It should be understood, however, that one of ordinary skill in the art understands that the number and type of frames in a group can vary according to the specifications of a particular embodiment. Additionally, in some aspects, one or more additional groups of frames can be between, before, and/or after the three groups of frames shown. In one aspect, the information transmission 200 can comprise a first group 204, a second group 206, and a third group 208. Though the terms first, second, and third generally suggest temporal succession, as used herein when referring to a group of frames or individual frames these terms do not necessarily limit the groups of frames or individual frames to a particular temporal order. For example, the second group 206 of frames can be followed by the first group 204 of frames, and the first group 204 of frames can be followed by the third group 208 of frames as shown in FIGS. 2A and 2B.

Each group of frames can have a frame that is encoded without reference to any other frame (herein referred to as an intra-coded frame or "I-frame") 210. In one aspect, the I-frame 210 can be at the beginning of the group of frames. Each group of frames 204, 206, 208 can also comprise frames that are encoded with reference to one or more other frames. For example, a frame can be encoded with reference to one other frame (herein referred to as a predictive frame or "P-frame"), such as an I-frame. 212. In one aspect, a P-frame 212 can comprise differences between the current frame (e.g., before encoding) and the previous frame (e.g., an I-frame). As another example, a frame can be encoded with reference to more than one other frame (herein referred to as a bi-directionally predictive frame or "B-frame") 214. In one aspect, a B-frame 214 can comprise differences between a previous frame (e.g., an I-frame or P-frame) and a current frame as well as differences between the current frame and a frame following the current frame (e.g., an I-frame or P-frame).

FIG. 2B is a diagram illustrating another exemplary information transmission 216 (e.g., information stream). In some aspects, the information transmission 216 can contain some or all of the aspects of the information transmission 200 of FIG. 2A. Additionally, the information transmission 216 can comprise one or more frames encoded with reference to a frame outside of the encoded frame's group of frames (herein referred to as a trick frame or "T-frame") 218. In one aspect, the T-frame 218 can behave similarly to a P-frame or B-frame because the T-frame 218 can also comprise differences between a previous or subsequent frame. Like the P-frame and B-frame, the T-frame 218 can be encoded with reference to frames within the group, but the T-frame 218 can also be encoded with reference to frames outside of the group of frames in which a T-frame 218 is located. For example, frame 220 can be encoded with reference to frame 218. In another aspect, frame 220 can be encoded with reference to frame 218 and frame 219. Thus, T-frames can be encoded with reference to other T-frames. In another aspect, T-frames can be encoded with reference an I-frame. For example, frame 220 can be encoded with reference to frame 222. As a further example, frame 220 can be encoded with reference to frame 222 and frame 219.

In one aspect, T-frames 218 can be embedded at regular intervals in the information transmission 216. As an example, T-frames 218 can be encoded such that the T-frames 218 function as frames in the information transmission 216 used during regular (e.g., 1× speed) play of the information transmission 216. In such a configuration, additional memory can, in some aspects, be employed at the user device to retain the frames referenced by the T-frames 218 to enable regular playback. On the other hand, less storage space can be used by the content device because additional files to support playback at different speeds can be eliminated. As another example, T-frames 218 can be embedded in an information transmission 216 such that the T-frames 218 are not used in ordinary playback of the information transmission 216. In this configuration, the information transmission 216 can comprise some frames that duplicate information from other frames. In other words, each T-frame 218 can potentially provide duplicate information to a P-frame or B-frame.

For the sake of simplicity, the T-frames 218 shown in FIG. 2B are placed in the information transmission 216 approximately every five frames, but the interval between T-frames 218 can vary according to the purpose of the T-frame 218. For example, frame 219 as shown is 6 frames away from frame 220. In some aspects, when the T-frame would otherwise replace an I-frame, the T-frame can be encoded proximate (e.g., directly before or after) the I-frame to avoid replacing the I-frame. For example, a T-frame 218 can be used to facilitate fast forward and/or rewind modes at the user device. Accordingly, the speed of the fast forward and/or rewind mode can determine the number of frames between each T-frame 218. For example, one or more sets of T-frames 218 can be encoded into an information transmission 216. Each set of T-frames 218 can correspond to a particular speed of play of the information transmission 216. Each T-frame 218 of the set of T-frames 218 can be spaced further apart in the information transmission for higher speed of play or closer together in the information transmission for a lower speed of play. For example, a set of T-frames 218 for 10× fast forward mode can be spaced 5 times further apart in the information transmission than a set of T-frames 218 for a 2× fast forward mode.

In another aspect, a set of T-frames 218 can correspond to a resolution of playback. For example, if a user device requests a lower resolution of play, the user device can receive a specified set of T-frames 218 in an information transmission 216 instead of the entire information transmission 216. Playing the specified set of T-frames 218 at normal speed can provide the user device with fewer frames per second, resulting in less resolution than the full transmission provides. Depending on the requested resolution, the user device can receive a set of T-frames 218 spaced by certain number of frames in the information transmission 216 for a lower resolution or spaced even further apart in the information transmission 216 for an even lower resolution.

As noted above, the content device can also encrypt the frames. In one aspect, the T-frames 218 can be encrypted with a key that rotates less frequently than every block. For example, if the content device cycles encryption keys every X number of seconds of playback and several groups of frames are transmitted as blocks that are X seconds in length, then, in some encryption schemes, every new block can be given a new encryption key. The T-frames 218, however, can be encrypted with one or more encryption keys different that than the other frames of the information transmission 216. For example, the content device can use a single encryption key for all T-frames 218 of a given set of T-frames 218. As another example, the content provider can cycle the encryption keys used for encrypting the T-frames 218 according to a pre-defined rate. In one aspect, the predefined rate can comprise a ratio of (i) a frame rate multiplied by a time interval to retain an encryption key and (ii) a number of reference frames per second. As an illustration, if the frame rate is X frames per second, the time interval is Y number of seconds, and there are Z number of T-frames 218 (or reference for the T-frame) per second, then the encryption key for the T-frames 218 can be changed every X multiplied by Y divided by Z seconds.

In another aspect, the user device can be configured to playback only a portion of the information transmission 216 by playing one or more T-frames 218. For example, the user device can request particular T-frames 218 as well any additional frames referenced by an encoded T-frame 218. These particular frames can be requested, for example, according to each frame's byte offset. Thus, the user device can avoid downloading the entire information transmission 216 and/or entire blocks of the information transmission 216 in order to access a subset of T-frames used for playback at a particular resolution or speed of play. Additionally, since the encryption key can be cycled at a different rate for the T-frames 218, the user device can avoid downloading a different encryption key for each T-frame 218 (e.g., the encryption key used by other frames in the block where the T-frame 218 is located) while playing the one or more T-frames 218.

It should be noted that FIGS. 2A and 2B show various frames with labels such as "I" (meaning I-frame), "P" (meaning P-frame), "B" (meaning B-frame), and "T" (meaning T-frame). Those of ordinary skill in the art will understand that these labels are for illustration purposes and are not intended to limit the invention to any of these specific embodiments. The type of encoding used can vary according to the content encoded, the encoding algorithm, and various other relevant factors.

Figure 3:
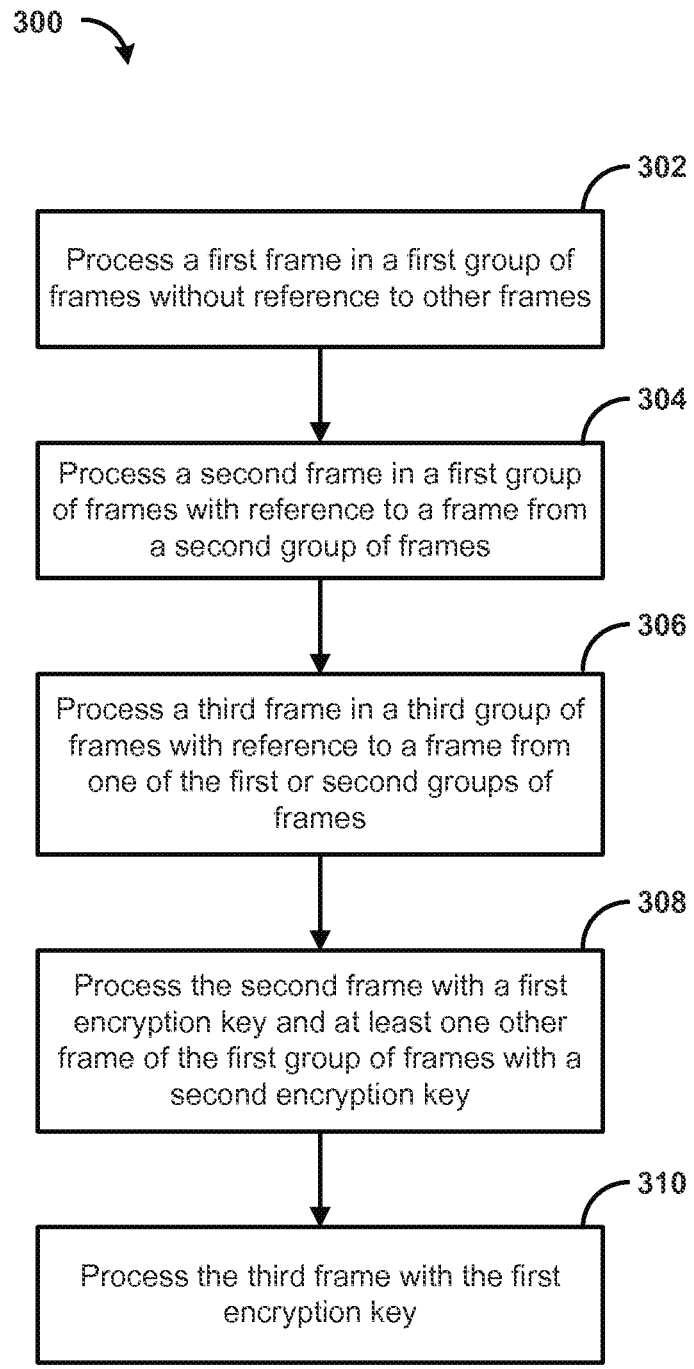
FIG. 3 is a flowchart illustrating an exemplary method for processing information.

FIG. 3 is a flowchart illustrating an exemplary method 300 for processing (e.g., encoding, decoding, encrypting, decrypting, linking, converting, and/or the like) information. In step 302, a first frame of a first group of frames of an information transmission (e.g., information stream) can be processed. In one aspect, the first frame can be processed without reference to other frames of the information transmission. For example, the first frame can be an I-frame. The information transmission can comprise a video transmission (e.g., video stream), audio transmission (e.g., audio stream), file transmission (e.g., file stream), and the like. In step 304, a second frame in the first group of frames can be processed. The second frame can be processed with reference to a frame from a second group of frames of the information transmission. In one aspect, the first group, second group, and other groups (e.g., groups described in FIGS. 3-5) can each be a group of frames or pictures (GOP) of an encoded MPEG stream. For example, the second group of frames can be processed before the first group of frames. Though the second group can be processed before the first group of frames, in some aspects, one or more other groups of frames can be processed between the second group and the first group of frames. Additionally, processing the second frame with reference to the frame from a second group of frames can comprise processing a difference between the second frame and at least the frame from the second group of frames.

In one aspect, the frame from the second group of frames can be processed without reference to other frames of the information transmission. For example, the frame from the second group of frames can be an I-frame. Alternatively, the frame from the second group of frames can be processed with reference to at least one fourth frame of the information transmission. In this case, the frame from the second group of frames can be a P-frame, B-frame, or the like.

In step 306, the third frame can be processed with reference to a frame from one of the first group of frames or the second group of frames. In step 308, the first group of frames can be processed. In one aspect, the second frame can be processed (e.g., encrypted, decrypted) with a first encryption key. Additionally, at least one other frame of the first group of frames can be processed (e.g., encrypted, decrypted) with a second encryption key. In some aspect, additional encryption keys can be utilized to process the first group of frames. In step 310, a third group of frames of the information transmission can be processed. For example, the third group of frames can comprise a third frame processed (e.g., encrypted, decrypted) with the first encryption key.

Furthermore, it should be noted that, the first group of frames can be separated from the second group of frames by one or more fourth group of frames of the information transmission. By way of example, the number of frames between the second frame and the third frame in the information transmission can be determined by at least one of a speed to play the information transmission or a resolution to play the information transmission. Thus, if the speed of play is set to X times regular speed (e.g., when the user is fast forwarding or rewinding the transmission), then the second and third frames can be separated by more frames than if the speed of play is set to regular speed. In some scenarios, the user may also desire to receive content at a lower resolution. For example, if the user is only partially paying attention to the content (e.g., driving in a vehicle, moving around a room, or other activity while listening to and perhaps occasionally viewing a video transmission), the user device can be configured to receive content at a lower resolution.

Figure 4:
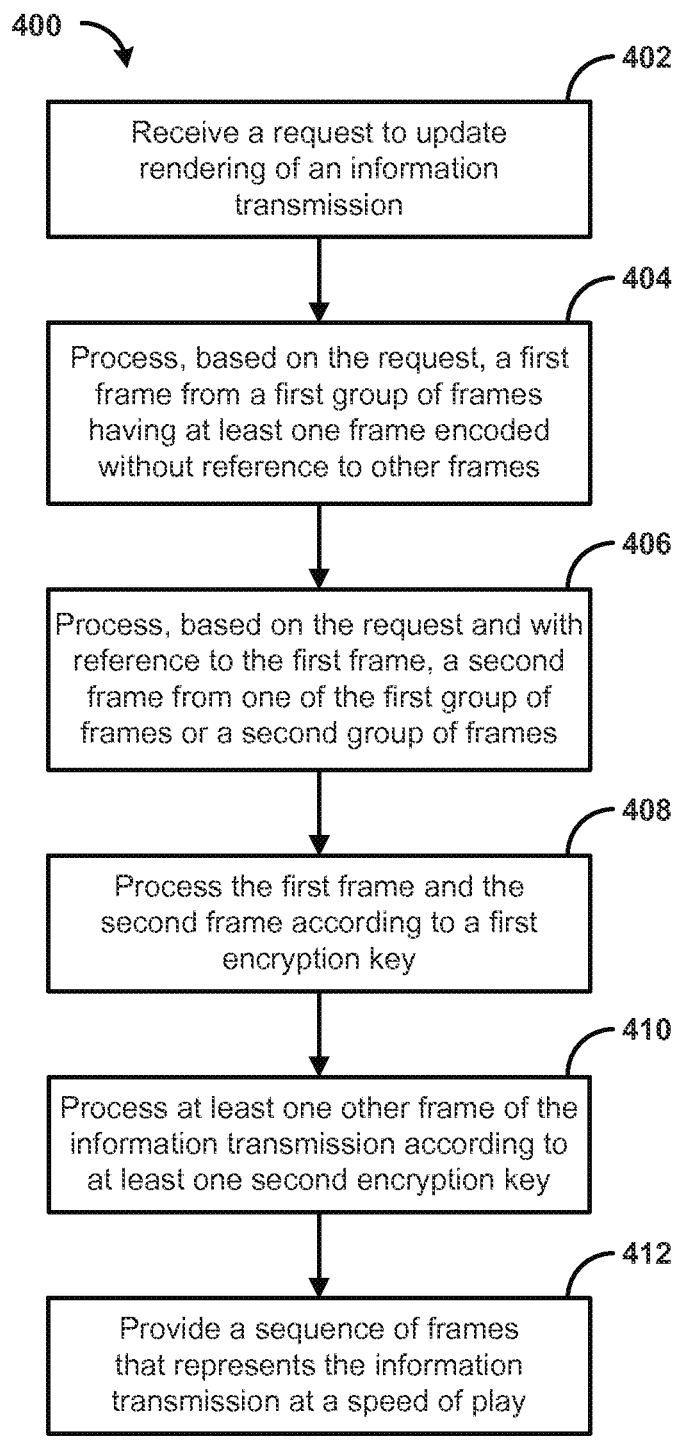
FIG. 4 is a flowchart illustrating another exemplary method for processing information.

FIG. 4 is a flowchart illustrating another exemplary method for processing (e.g., encoding, decoding, encrypting, decrypting, linking, converting, and/or the like) information. In step 402, a request to update rendering of an information transmission (e.g., information stream) can be received. As an example, a request can be received to update at least one of a speed of play, a resolution of play, or a direction of play. The information transmission can comprise a video transmission (e.g., video stream), audio transmission (e.g., audio stream), file transmission (e.g., file stream), and the like. In step 404, a first frame from a first group of frames of the information transmission can be processed based on the request. The first group of frames can have at least one frame processed without reference to other frames of the information transmission (e.g., an I-frame). In step 406, a second frame can be processed from one of the first group of frames of the information transmission or a second group of frames of the information transmission based on the request. The second group of frames can have at least one frame processed without reference to other frames of the information transmission (e.g. an I-frame). In one aspect, the processing of the second frame can be performed with reference to the first frame. For example, processing the second frame with reference to the first frame can comprise decoding and/or otherwise processing the second frame based on a difference between at least the first frame and the second frame.

In one aspect, the information transmission can be decrypted. In step 408, the first frame and the second frame can be processed (e.g., encrypted, decrypted) according to a first encryption key. In step 410, at least one other frame of the information transmission can be processed (e.g., encrypted, decrypted) according to at least one second encryption key. In one aspect, the at least one other frame of the information transmission can comprise a frame of one of the first group of frames or the second group of frames.

In step 412, a sequence of frames of the information transmission can be provided. For example, the sequence of frames can comprise the first frame and the second frame. The sequence of frames can represent the information transmission for at least one of a speed of play or a resolution of play. In one aspect, the first frame can be separated from the second frame by a specified number of frames in the information transmission. The specified number can be determined by at least one of the speed of play of the information transmission or the resolution of play of the information transmission. Accordingly, the first group of frames can be separated from the second group of frames by one or more third group of frames of the information transmission.

Figure 5:
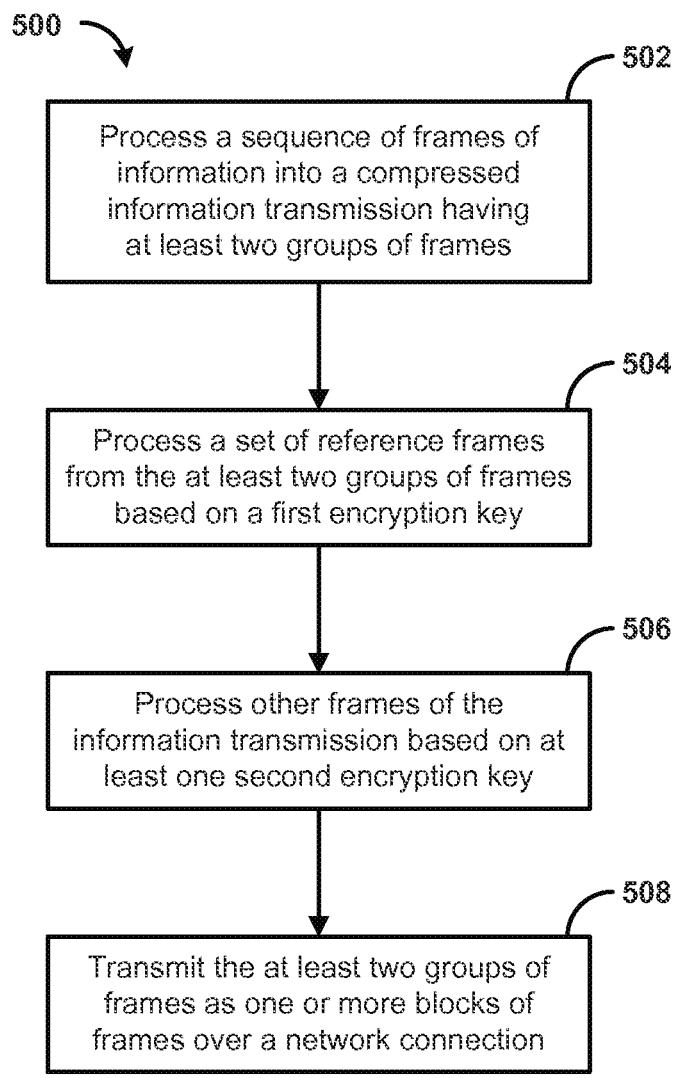
FIG. 5 is a flowchart illustrating yet another exemplary method for processing information.

FIG. 5 is a flowchart illustrating yet another exemplary method for processing (e.g., encoding, decoding, encrypting, decrypting, linking, converting, and/or the like) information. In one aspect, the information can comprise a video, audio, text, a file, and the like. In step 502, a sequence of frames of information can be processed into a compressed information transmission (e.g., compressed information stream). Thus, the compressed information transmission can comprise a compressed video transmission, audio transmission, text data transmission, file transmission, and the like. The information can have at least two groups of frames. Additionally, each group of frames of the at least two groups of frames can have at least one frame processed (e.g., encoded) without reference to other frames of the information. As an example, in step 502, a set of reference frames can be processed. Each frame of the set of reference frames can be processed with reference to at least one respective basis frame. Additionally, each respective basis frame can be in a corresponding group of frames of the at least two groups of frames, and each corresponding group of frames can comprise frames other than the corresponding frame of the set of references frames. For example, at least one frame of the set of reference frames can be located in a group of frames of the at least two groups of frames different from the corresponding group of frames. For example, processing each reference frame with reference to at least one basis frame can comprise encoding and/or otherwise processing a difference in information between the reference frame and the respective basis frame.

In step 504, the set of reference frames can be processed based on a first encryption key. In one aspect, the set of reference frames can be frames from the at least two groups of frames. Alternatively, a portion of the set of reference frames can be processed based on a second encryption key instead of the first encryption key. The portion of the set of reference frames can be selected based on a predefined rate for updating encryption keys. In one aspect, the predefined rate can comprise a ratio of (i) a frame rate multiplied by a time interval to retain an encryption key and (ii) a number of reference frames per second.

In step 506, other frames of the information transmission can be processed based on at least one second encryption key. The other frames can be frames from the at least two groups of frames not included in the set of reference frames. In step 508, the at least two groups of frames can be transmitted as one or more blocks of frames over a network connection. Each block of frames can comprise one or more groups of frames of the at least two groups of frames. In one aspect, the number of the one or more groups of frames on each block of frames can fluctuate based on the quality of the network connection. In one aspect, the set of reference frames can represent the information for at least one of a speed of play or a resolution of play. For example, each frame of the set of reference frames can be separated by a specified number of frames in the information. Accordingly, the specified number can be determined by at least one of a speed of play or a resolution of play.

Figure 6:
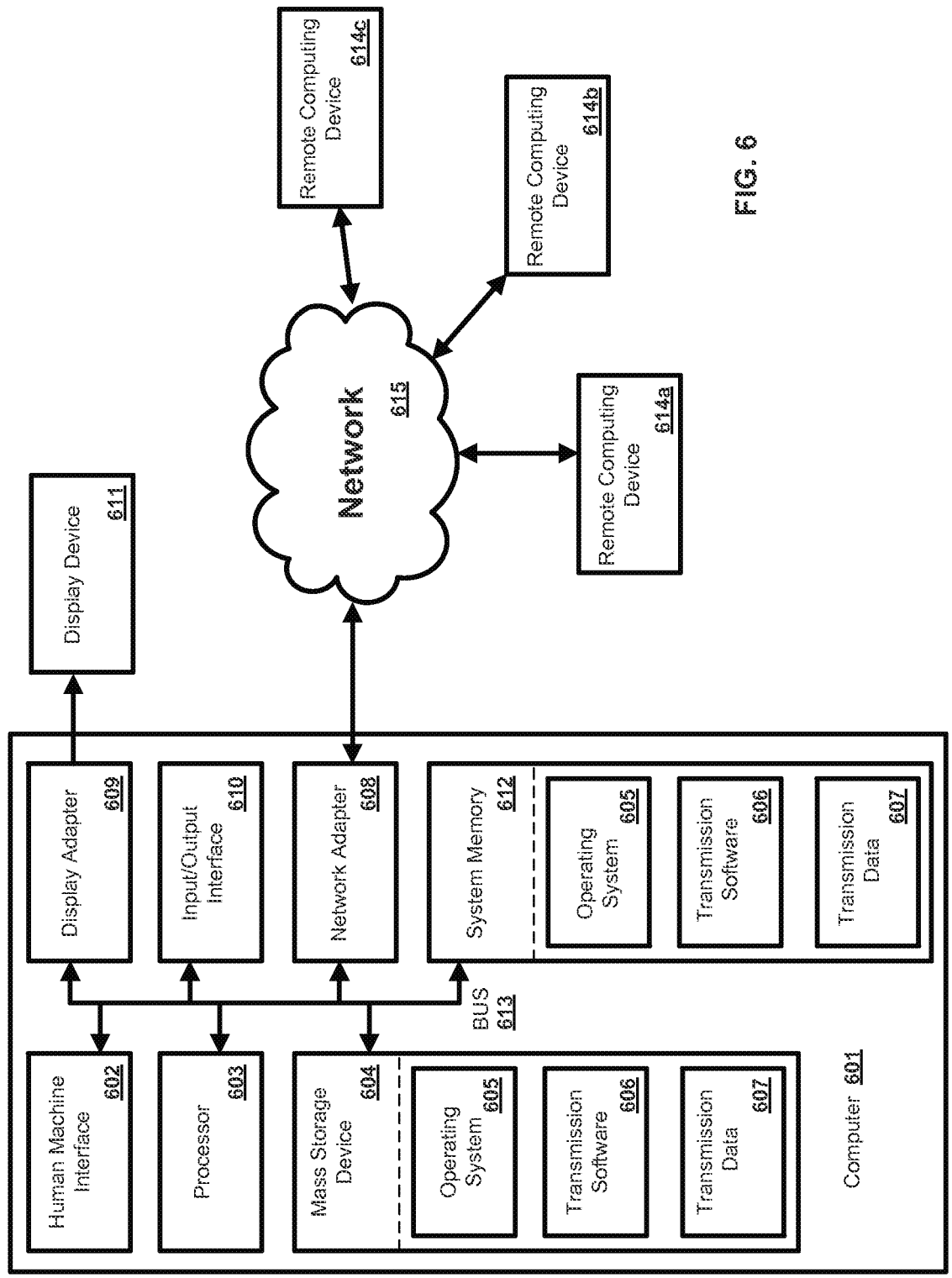
FIG. 6 is a block diagram illustrating an exemplary computer in which the present systems and methods can operate.

In an exemplary aspect, the methods and systems can be implemented on a computer 601 as illustrated in FIG. 6 and described below. By way of example, content device 102 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, transmission software 606, transmission data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as transmission data 607 and/or program modules such as operating system 605 and transmission software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and transmission software 606. Each of the operating system 605 and transmission software 606 (or some combination thereof) can comprise elements of the programming and the transmission software 606. Transmission data 607 can also be stored on the mass storage device 604. Transmission data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of transmission software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
processing a first frame of a first group of frames of a video transmission, wherein the first frame is processed without reference to other frames of the video transmission; and
processing a second frame in the first group of frames, wherein the second frame is processed with reference to a frame from a second group of frames of the video transmission, wherein the second group of frames comprises a third frame processed without reference to other frames of the video transmission, and wherein the first group of frames is separated from the second group of frames by at least one intermediate group of frames having a fourth frame processed without reference to other frames of the video transmission.

2. The method of claim 1, wherein the second group of frames is processed before the first group of frames.

3. The method of claim 1, further comprising encrypting the first group of frames, wherein the second frame is encrypted with a first encryption key and at least one other frame of the first group of frames is encrypted with a second encryption key.

4. The method of claim 3, further comprising encrypting a third group of frames of the video transmission, wherein the third group of frames comprises a fifth frame encrypted with the first encryption key, and wherein the fifth frame is processed with reference to a sixth frame from one of the first group of frames or the second group of frames.

5. The method of claim 4, wherein a number of frames between the second frame and the fifth frame in the video transmission is determined by at least one of a speed to play the video transmission or a resolution to play the video transmission.

6. The method of claim 1, wherein the frame from the second group of frames is processed with reference to a fifth frame of the video transmission.

7. The method of claim 1, wherein processing the second flame with reference to the flame from the second group of frames comprises processing a difference between the second flame and the flame from the second group of frames.

8. A method comprising:
receiving a request to update rendering of a video transmission;
processing a first frame from a first group of frames of the video transmission based on the request,
the first group of frames having at least one frame processed without reference to other frames of the video transmission;
and processing a second frame from a second group of frames of the video transmission based on the request,
the second group of frames having at least one frame processed without reference to other frames of the video transmission,
wherein processing the second frame is performed with reference to the first frame,
wherein the first group of frames is separated from the second group of frames by a third group of frames having at least one frame process without reference to other frames of the video transmission.

9. The method of claim 8, wherein receiving the request to update rendering of the video transmission comprises receiving a request to update at least one of a speed of play, a resolution of play, or a direction of play.

10. The method of claim 8, further comprising decrypting the video transmission, wherein the first frame and the second frame are decrypted according to a first encryption key and at least one other frame of the video transmission is decrypted according to a second encryption key.

11. The method of claim 10, wherein the at least one other frame of the video transmission comprises a frame from one of the first group of frames or the second group of frames.

12. The method of claim 8, further comprising providing a sequence of frames of the video transmission, the sequence of frames comprising the first frame and the second frame, wherein the sequence of frames represents the video transmission for at least one of a speed of play or a resolution of play.

13. The method of claim 12, wherein the first frame is separated from the second frame by a specified number of frames in the video transmission, wherein the specified number of frames is determined by at least one of the speed of play of the video transmission or the resolution of play of the video transmission.

14. The method of claim 8, wherein processing the second frame with reference to the first frame comprises decoding the second frame based on a difference between the first frame and the second frame.

15. A method comprising:
processing a sequence of frames of video into a compressed video transmission, the video comprising at least two groups of frames, each group of frames of the at least two groups of frames comprises a first frame, and wherein each of the first frames is processed without reference to other frames of the video;
processing a set of reference frames based on a first encryption key that is cycled based on a number of reference frames per second of the compressed video transmission, the set of reference frames comprising frames from the at least two groups of frames, wherein each frame of the set of reference frames is processed with reference to at least one respective basis frame, each respective basis frame being in a corresponding group of frames of the at least two groups of frames, wherein at least one frame of the set of reference frames is located in a group of frames of the at least two groups of frames different from the corresponding group of frames; and
processing other frames of the compressed video transmission based on at least one second encryption key, the other frames comprising frames from the at least two groups of frames not included in the set of reference frames.

16. The method of claim 15, further comprising transmitting the at least two groups of frames as one or more blocks of frames over a network connection, each block of frames comprising one or more groups of frames of the at least two groups of frames, a number of the one or more groups of frames in each block of frames fluctuating based on a quality of the network connection.

17. The method of claim 15, wherein processing each frame of the set of reference frames with reference to at least one respective basis frame comprises encoding a difference in information between each of the reference frames and the respective basis frame.

18. The method of claim 15, further comprising encrypting a portion of the set of reference frames based on the at least one second encryption key instead of the first encryption key, the portion of the set of reference frames being selected based on a predefined time period for updating encryption keys.

19. The method of claim 18, wherein the predefined time period comprises (i) a frame rate multiplied by a time interval to retain an encryption key divided by (ii) a number of reference frames per second.

20. The method of claim 15, wherein the set of reference frames represents the video for at least one of a speed of play or a resolution of play.

21. The method of claim 20, wherein each frame of the set of reference frames is separated by a specified number of frames in the video, the specified number of frames determined by at least one of the speed of play or the resolution of play.

* * * * *